United States Patent [19]  [11] Patent Number: 4,621,016
Kawata et al.  [45] Date of Patent: Nov. 4, 1986

[54] MAGNETIC RECORDING MEDIA

[75] Inventors: Akiho Kawata; Youichiro Morino; Harumi Okajima; Shuichi Miya, all of Gunma, Japan

[73] Assignee: Kanto Denka Kogyo Co., Ltd., Tokyo, Japan

[21] Appl. No.: 647,670

[22] Filed: Sep. 6, 1984

[30] Foreign Application Priority Data

Sep. 28, 1984 [JP] Japan ................................. 58-179933

[51] Int. Cl.$^4$ ............................................... G11B 5/70
[52] U.S. Cl. .................................. 428/323; 252/62.54; 427/128; 427/359; 428/408; 428/694; 428/900; 360/134; 360/135; 360/136
[58] Field of Search ............... 428/323, 408, 694, 695, 428/900; 427/128; 360/134–136; 252/62.54

[56] References Cited

U.S. PATENT DOCUMENTS

| | | | |
|---|---|---|---|
| 4,419,406 | 12/1983 | Isobe | 428/694 |
| 4,431,703 | 2/1984 | Somezawa | 428/694 |
| 4,450,199 | 5/1984 | Tadokoro | 428/694 |
| 4,452,863 | 6/1984 | Takizawa | 428/694 |
| 4,492,734 | 1/1985 | Ogawa | 428/694 |
| 4,539,257 | 9/1985 | Ryoke | 428/323 |
| 4,546,038 | 10/1985 | Yamaguchi | 428/694 |
| 4,556,604 | 12/1985 | Ohbayashi | 428/694 |

*Primary Examiner*—Ellis P. Robinson
*Attorney, Agent, or Firm*—Browdy and Neimark

[57] ABSTRACT

By inclusion of a fluorinated graphite material in conjunction with carbon black in the magnetic layer of a magnetic recording medium, the medium is improved significantly in its surface properties and electromagnetic performance properties as well as magnetic characteristics.

13 Claims, No Drawings

MAGNETIC RECORDING MEDIA

BACKGROUND OF THE INVENTION

This invention relates to magnetic recording media such as magnetic audio and video recording tapes, sheets and disks and, in particular, to magnetic recording media having a magnetic layer improved in its abrasive resistance and smooth-running properties and thus being well durable under severe conditions as usually encountered in VTR (video tape recorder) instruments.

It has been well-known in the art to incorporate carbon black into the magnetic layer primarily for antistatic purpose. However, where carbon black is added to a magnetic coating composition from which a magnetic layer is formed on a substrate to provide a magnetic recording medium, the carbon black affects adversely the dispersibility of the coating composition. If such a composition of poor dispersibility is applied on the surface of substrate, the resulting recording medium product will show poor coating surface properties, such as unduly high friction coefficient and roughness. In addition, the incorporation of carbon black may result in an undesirably increased viscosity of coating composition which lowers the coating operation efficiency. Moreover it is known also that, since the incorporation of carbon black reduces necessarily the relative porportion of a magnetic powder which may be present in the coating composition and hence in the magnetic layer, various electromagnetic performance properties such as video sensitivity of the recording medium are undesirably reduced by the addition of carbon black.

SUMMARY OF THE INVENTION

We have intensively worked to eliminate or substantially reduce the problems due to the inclusion of carbon black in the magnetic layer, and to provide a magnetic recording medium improved in its abrasive resistance and smooth-running properties. We have now realized that these and other objects can be achieved advantageously by the inclusion of a fluorinated graphite material in conjunction with carbon black in the magnetic layer of recording medium.

It has been found that the addition of the fluorinated graphite material together with carbon black lowers effectively the friction coefficient of the magnetic layer and ensures smooth-running properties and durability of the medium even under severe conditions as encountered in VTR instruments. In addition, it has been found that the fluorinated graphite additive improves the dispersibility of the magnetic coating composition and thus permits an increased proportion of magnetic powder material to be incorporated in the composition, resulting in a recording medium of an increased output.

DETAILED DESCRIPTION OF THE INVENTION

The present magnetic recording medium will be described in more detail.

Preferably, the carbon black used in the present invention has an average primary particle size of about 0.01-1 micron. When the carbon black has an average primary particle size greater than 1 micron, a magnetic layer of poor surface properties is obtained, which may affect S/N properties of the product medium.

The fluorinated graphite material used in the present invention may be represented by the formula $(CF_x)_n$ wherein the value of $x$ is greater than 0.1 but less than 1 (unity).

Preferably, the fluorinated graphite has an average primary particle size of less than about 2 microns, in particular of about 0.01–0.1 micron.

It is preferred that the fluorinated graphite material is prepared by fluorination of a finely divided carbonaceous material, such as carbon black, having an average particle size corresponding to the preferred range for the fluorinated graphite material. If a conventional coarse carbon material which usually has a relatively large average particle size on the order of 10 microns is first fluorinated and then pulverized, the product fluorinated graphite has a unduly broad particle size distribution which necessitates a classification stage to give a fraction of the desired particle size. In addition, such a fluorinated and pulverized graphite material may exhibit an unsatisfactory performance in the magnetic recording media possibly due to the virgin surfaces which are produced during the pulverization of fluorinated material and are believed to behave differently from the surfaces of the unpulverized material per se.

On the other hand, if it is intended to produce a fluorinated graphite material useful in the present invention by directly treating a finely divided carbonaceous material with a gaseous stream of fluorine diluted with an inert gas such as nitrogen, then the reaction mixture tends to detonate vigorously or to produce a gaseous fluorocarbon mixture containing a major proportion of carbon tetrafluoride in preference to the intended fluorinated graphite product. Thus, such a direct fluorination route is not suitable for the production of the fluorinated graphite useful in the present invention.

We have found that the direct fluorination process can be carried out safely and effectively by dilution of the finely divided carbonaceous material with an amount of previously prepared fluorinated graphite. In a preferred process, thus, a finely pulverized carbonaceous material having an average particle size of about 0.01–0.1 micron is first mixed with a previously prepared fluorinated graphite product in an amount of at least half of the amount of said carbonaceous material (by weight), and then the mixture is brought into contact with a fluorine-containing stream at a temperature of about 200°–500° C. to give the desired product. The thus obtained product may be employed advantageously in the present invention.

Relative proportions of the fluorinated graphite and carbon black used in the coating composition are such that the fluorinated graphite material is present in a proportion of about 5–90%, preferably about 10–60% by weight of the total weight of the fluorinated graphite material and carbon black in the composition. If the graphite material is present at concentrations lower than the above range, an unsatisfactory dispersibility may be achieved in the coating composition, resulting in poor abrasive resistance and poor smooth-running properties. On the other hand, if the fluorinated graphite is used at concentrations exceeding the above range, the antistatic effect of the carbon black becomes weakened undesirably.

It has been also found that an advantageous combination of the dispersibility of coating composition and the magnetic recording density, S/N, abrasive resistance and smooth-running properties of the product recording medium can be obtained, when the carbon black and graphite material are employed in a total amount of about 0.3–20 parts, especially about 1–15 parts by weight per 100 parts by weight of the magnetic powder material.

The magnetic powder materials used in the present invention may be the conventional ones. Examples of the magnetic materials which may be mentioned include powders of gamma-$Fe_2O_3$, $Fe_3O_4$; gamma-$Fe_2O_3$ doped with one or more doping elements such as Co, Ni and Mn; $Fe_3O_4$ doped with a doping element or elements as above-mentioned; $CrO_2$; and ferromagnetic alloys.

The binders used in the present invention may be the conventional ones, for example vinylchloride/vinylacetate copolymers, polyurethane resins, epoxy resins, cellulosic resins, acrylate/acrylonitrile copolymers, acrylate resins, polyester resins, vinyl acetate resins and rubber-based binders. The binders may be used alone or in admixture of two or more binders.

The substrates or carriers used in the invention may be of the conventional materials including various plastic materials such as polyesters, polyvinylchloride polystyrene, polyamides, polycarbonates, cellulose ethers and other equivalents.

In the practice of the present invention, the following advantages are achieved:

(1) The presence of fluorinated graphite material improves the dispersibility of the coating composition and thus permits the magnetic powder material to be contained in an increased content in the composition, resulting in a product recording medium of an increased output.

(2) The friction coefficient of the magnetic layer is so reduced that the medium is enabled to travel smoothly and consistently.

(3) The durability of the medium is enhanced. The medium may resist to use under severe conditions as encounted in VTR instruments.

(4) The improved dispersibility of the magnetic coating composition provides the magnetic layer with a smooth surface.

(5) The coating composition may have a low viscosity suitable for efficient coating operation.

The following Examples are presented to more fully illustrate the present invention.

EXAMPLE 1

|  | Parts by weight |
|---|---|
| Co-containing acicular gamma-iron oxide | 100 |
| BTH ½ | 10 |
| (nitrocellulose ex Asahi Chemical Industry Co.) | |
| T-5260 S | 15 |
| (polyurethane ex Dainihon Ink Industry Co.) | |
| Coronate L | 5 |
| (polyurethane ex Nippon Polyurethane Industry Co.) | |
| carbon black (0.03 microns) | 3 |
| fluorinated graphite (0.06 microns) | 3 |
| methyl ethyl ketone (MEK) | 100 |

-continued

|  | Parts by weight |
|---|---|
| cyclohexanone | 150 |

The above ingredients were dispersion-mixed together in a sand mill to prepare a magnetic coating composition. Then the composition was passed through a filter of an average aperture size of 1.0 micron and spread over a surface of an 14 microns thick polyester film in an amount such as to leave a 4 micron dried coat thereon. After drying, the coated polyester film was calendered and then heat-treated at 50° C. for 96 hours. The thus treated film was slit into a video recording tape of an appropriate width.

EXAMPLE 2

|  | Parts by weight |
|---|---|
| ferromagnetic iron-based alloy powder | 100 |
| VAGH | 10 |
| (vinylchloride/vinylacetate copolymer ex UCC) | |
| Nipporan N-2304 | 15 |
| (polyurethane ex Nippon Polyurethane Industry Co.) | |
| Paraprene 26SM | 5 |
| (polyurethane ex Nippon Polyurethane Industry Co.) | |
| Coronate L | 8 |
| carbon black (0.03 microns) | 3 |
| fluorinated graphite (0.03 microns) | 3 |
| dispersant GAFAC RS-610 | 3 |
| (ex Toho Chemical Industry Co.) | |
| MEK | 150 |
| cyclohexanone | 150 |

As in Example 1, the ingredients were dispersion-mixed in a sand mill to prepare a magnetic paint, which was then coated in a 2 micron dry thickness on a film as used in Example 1.

COMPARATIVE EXAMPLE 1

The procedure as described in Example 1 was repeated except that the fluorinated graphite was omitted from the paint composition of Example 1 and the proportion of carbon black was doubled.

COMPARATIVE EXAMPLE 2

The procedure as described in Example 2 was repeated except that the fluorinated graphite was omitted from the paint composition of Example 2 and the proportion of carbon black was doubled.

The recording tapes from the above Examples were subjected to performance tests. The results are summerized in the table below.

|  | Magnetic Characteristics | | | Video Characteristics | | | | Friction coefficient | Paint Viscosity (Poises) |
|---|---|---|---|---|---|---|---|---|---|
|  | Hc (Oe) | Br (Gs) | Br/Bm | Sensitivity (dB) | | | S/N (dB) | Still properties (minutes) | |
|  | | | | 1 MHz | 3 MHz | 5 MHz | | | |
| Example 1 | 708 | 1310 | 0.83 | +1.6 | +1.8 | +1.0 | +2.8 | >60 | 0.31 | 50 |
| Comp. Ex. 1 | 699 | 1050 | 0.80 | 0 | 0 | 0 | 0 | 15 | 0.42 | 80 |
| Example 2 | 1381 | 2420 | 0.79 | +0.4 | +2.1 | +3.0 | +2.6 | >60 | 0.33 | 40 |
| Comp. Ex. 2 | 1402 | 2120 | 0.75 | 0 | 0 | 0 | 0 | 20 | 0.45 | 60 |

By comparing the performances shown in the table, it is evident that the recording media according to the present invention are improved significantly in magnetic characteristics, video characteristics and friction coefficient. The improvement in the magnetic characteristics is indicative good dispersibility of the ferromagnetic powder material in the paint composition. It will be appreciated that the improvement in still properties reflects an improved durability of medium. Moreover, the paint compositions according to the present invention exhibit apparently reduced viscosities and enable the filtration operation to be carried out rapidly.

What is claimed is:

1. A magnetic recording medium consisting of a magnetic layer comprising particles of a magnetic powder material embedded in a matrix of a binder and a substrate carrying said magnetic layer, wherein said magnetic layer further comprises carbon black and a fluorinated graphite material in a total amount of about 0.3–20 parts by weight per 100 parts by weight of said magnetic powder material and said fluorinated graphite material is present in a relative proportion of about 5–90% by weight of the total weight of said carbon black and fluorinated graphite material.

2. A magnetic recording medium as claimed in claim 1 wherein said fluorinated graphite material is represented by the formula:

$$(CF_x)_n$$

wherein x is a value greater than 0.01 but less than 1.

3. A magnetic recording medium as claimed in claim 1 wherein said carbon black has an average primary particle size of about 0.01–1 micron and said fluorinated graphite material has an average particle size of about 0.01–0.1 micron.

4. A magnetic recording medium as claimed in claim 1 wherein said carbon black and fluorinated graphite material are present in a total amount of about 1–15 parts by weight per 100 parts by weight of said magnetic powder material and said fluorinated graphite material is present in a relative proportion of about 10–60% by weight of the total weight of said carbon black and fluorinated graphite material.

5. A process for producing a magnetic recording medium as claimed in claim 1 comprising the steps of:
   providing a magnetic paint composition comprising a magnetic powder material, carbon black, a fluorinated graphite material and a binder, said carbon black and fluorinated graphite material being present in a total amount of about 0.3–20 parts by weight per 100 parts by weight of said magnetic powder material, said fluorinated graphite material being present in a relative proportion of about 5–90% by weight of the total weight of said carbon black and fluorinated graphite material;
   applying said paint composition to a substrate;
   drying said coated substrate; and
   calendering and aging said dried substrate to condition the thus formed magnetic layer thereon.

6. A process as claimed in claim 5 wherein said fluorinated graphite material is represented by the formula:

$$(CF_x)_n$$

wherein x is a value greater than 0.01 but less than 1.

7. A process as claimed in claim 5 wherein said carbon black has an average primary particle size of about 0.01–1 micron and said fluorinated graphite material has an average primary particle size of about 0.01–0.1 micron.

8. A process as claimed in claim 5 wherein said carbon black and fluorinated graphite material are present in a total amount of about 1–15 parts by weight per 100 parts by weight of said magnetic powder material and said fluorinated graphite material is present in a relative proportion of about 10–60% by weight of the total weight of said carbon black and fluorinated graphite material.

9. A magnetic recording medium as claimed in claim 1 wherein said carbon black and fluorinated graphite material are present in a total amount of about 1–15 parts by weight per 100 parts by weight of said magnetic powder material.

10. A magnetic recording medium as claimed in claim 1 wherein said fluorinated graphite material is present in a relative proportion of about 10–60% by weight of the total weight of said carbon black and fluorinated graphite material.

11. The process of claim 5 further comprising the step of slitting said conditioned product into a strip or ribbon of magnetic recording medium.

12. A process as claimed in claim 5 wherein said carbon black and fluorinated graphite material present in a total amount of about 1–15 parts by weight per 100 parts by weight of said magnetic powder material.

13. A process as claimed in claim 5 wherein said fluorinated graphite material is present in a relative proportion of about 10–60% by weight of the total weight of said carbon black and fluorinated graphite material.

* * * * *

UNITED STATES PATENT AND TRADEMARK OFFICE
CERTIFICATE OF CORRECTION

PATENT NO. : 4,621,016
DATED : November 4, 1986
INVENTOR(S) : KAWATA et al

It is certified that error appears in the above-identified patent and that said Letters Patent is hereby corrected as shown below:

Correct filing date of foreign priority application:

[30] Foreign Application Priority Data
Sep 28, 1983 [JP] Japan......58-179933

Signed and Sealed this

Seventeenth Day of March, 1987

*Attest:*

DONALD J. QUIGG

*Attesting Officer*   *Commissioner of Patents and Trademarks*